US012808123B2

(12) United States Patent
Gu et al.

(10) Patent No.: US 12,808,123 B2
(45) Date of Patent: Nov. 24, 2026

(54) LACTAM-CONTAINING POLYMERS FOR PAPERMAKING

(71) Applicant: SOLENIS TECHNOLOGIES, L.P., Wilmington, DE (US)

(72) Inventors: Qu-Ming Gu, Wilmington, DE (US); Suboh Abdallah, Wilmington, DE (US); Sachin Borkar, Wilmington, DE (US)

(73) Assignee: SOLENIS TECHNOLOGIES, L.P., Wilmington, DE (US)

( * ) Notice: Subject to any disclaimer, the term of this patent is extended or adjusted under 35 U.S.C. 154(b) by 26 days.

(21) Appl. No.: 17/809,275

(22) Filed: Jun. 28, 2022

(65) Prior Publication Data

US 2022/0412008 A1 Dec. 29, 2022

Related U.S. Application Data

(60) Provisional application No. 63/202,903, filed on Jun. 29, 2021.

(51) Int. Cl.

| | |
|---|---|
| ***D21H 17/45*** | (2006.01) |
| ***C08F 8/12*** | (2006.01) |
| ***D21H 17/43*** | (2006.01) |
| ***D21H 17/55*** | (2006.01) |
| ***D21H 21/10*** | (2006.01) |
| *C08F 226/02* | (2006.01) |

(52) U.S. Cl.

CPC ............... *D21H 17/45* (2013.01); *C08F 8/12* (2013.01); *D21H 17/43* (2013.01); *D21H 17/55* (2013.01); *D21H 21/10* (2013.01); *C08F 226/02* (2013.01)

(58) Field of Classification Search

CPC ........ D21H 17/48; D21H 21/10; D21H 17/45; D21H 17/55; C08F 226/02

USPC ....................................................... 162/168.2

See application file for complete search history.

(56) References Cited

U.S. PATENT DOCUMENTS

| | | | |
|---|---|---|---|
| 4,774,285 A | 9/1988 | Pfohl et al. | |
| 4,921,621 A * | 5/1990 | Costello | C08F 8/12 507/120 |
| 2012/0205065 A1 | 8/2012 | Esser | |
| 2013/0261275 A1 | 10/2013 | Musa et al. | |
| 2014/0102649 A1 | 4/2014 | Esser | |
| 2016/0067703 A1 | 3/2016 | Jaber et al. | |
| 2020/0240084 A1 | 7/2020 | Hamers et al. | |
| 2022/0048494 A1 | 2/2022 | Miura et al. | |
| 2022/0356650 A1 * | 11/2022 | Barriere | D21H 17/455 |

FOREIGN PATENT DOCUMENTS

| | | | | |
|---|---|---|---|---|
| CA | 2145286 C * | 3/2005 | C08F 8/12 |
| CA | 3112521 A1 | 3/2020 | |
| CN | 102076910 A | 5/2011 | |
| CN | 107923127 A | 4/2018 | |
| CN | 113039223 A | 6/2021 | |
| DE | 3144770 A1 * | 5/1983 | |
| JP | 2013064041 A | 4/2013 | |
| WO | 2020053393 A1 | 3/2020 | |
| WO | 2020053939 A1 | 3/2020 | |
| WO | WO-2020260779 A1 * | 12/2020 | D21H 21/10 |

OTHER PUBLICATIONS

Machine translation of DE 3144770 (no date).*

"Amine Functional Polymers Base on N-ethenylformamide" authored by Pinschmidt et al., and published in Progress in Organic Coatings (1996) 27, 209-218.*

A discussion of Amide Hydrolysis authored by James Ashenhurst (Apr. 10, 2025) available at https://www.masterorganicchemistry.com/2019/10/07/amide-hydrolysis/.*

"Papermaking Part II: Surface and Colloid Chemistry of Papermaking Processes" authored by Wang et al. and published in the Encyclopedia of Surface and Colloid ScienceDOI:10.1081/E-ESCS-120041487 @2006 Taylor and Francis, pp. 4435-4451.*

"The Technical Edge: Understanding Cationic Retention Aids in Modern Papermaking" (no date).*

ISA/US, International Search Report and Written Opinion issued in Int. Appl. No. PCT/US2022/073245 mailed Oct. 25, 2022.

* cited by examiner

*Primary Examiner* — Marc S Zimmer

(74) *Attorney, Agent, or Firm* — Ingrassia Fisher & Lorenz LLP

(57) ABSTRACT

Lactam-containing polyvinylamine-based polymers, methods for producing lactam-containing polyvinylamine-based polymers, and methods for papermaking are provided. An exemplary method for producing an lactam-containing polyvinylamine-based polymer includes performing radical polymerization of a vinylamide monomer, a vinyl monomer containing an amide functional group, and, optionally, a vinyl monomer that contains a carboxylic acid group, to obtain a prepolymer. Further, the method includes hydrolyzing the prepolymer under alkaline conditions to obtain the lactam-containing polyvinylamine-based polymer.

18 Claims, No Drawings

LACTAM-CONTAINING POLYMERS FOR PAPERMAKING

CROSS-REFERENCE TO RELATED APPLICATION

This application claims the benefit of U.S. Provisional Application No. 63/202,903, filed Jun. 29, 2021, which is hereby incorporated in its entirety by reference.

TECHNICAL FIELD

Embodiments described herein relate to methods for preparing lactam-containing polyvinylamine-based polymers, such as polyvinylamine-based amphoteric terpolymers, and to papermaking methods using the prepared vinylamine-based polymers as dry strength additives, wet strength additives, retention aids, drainage aids, and/or pitch and stickies control agents.

BACKGROUND

Polyvinylamine has been used in many industrial and pharmaceutical applications. In the papermaking industry, poly(vinylamine) products have been used as dry and wet strength additives to improve paper and paperboard strength and as retention/drainage aids to improve runability and productivity of a paper machine. Polyvinylamine is generally considered as a linear homopolymer and typically contains free amine and formamide when the prepolymer polyvinylformamide is not fully hydrolyzed.

There are known papermaking processes using cationic polymeric flocculants including a polyvinylamine based cationic polymer having an amidine structure. Further, there are known papermaking process that use polymers containing a lactam functional group that are prepared by free radical polymerization of N-vinylformamide (NVF) and acrylonitrile followed by hydrolysis with concentrated hydrochloric acid and heating to form cyclized amide. Also, there are known processes for making polyvinylamine based polymers having five-membered lactams as structural units with more than 20 mol % lactam functional groups by free radical polymerization of NVF and acrylamide and then hydrolyzation under acidic conditions.

Further, while it is known that reaction of carboxyl groups of polyacrylic acid can react with adjacent amine groups to form a lactam ring, the reaction insufficiently yields low level ring containing lactams with no known desired physical properties.

Also, while there are known processes for preparing polymers containing five different functional groups by using alkyl acrylate as a comonomer to polymerize with NVF and acrylic acid through free radical polymerization, such processes use small chain acrylates, which are volatile and requires special handling, shipping, and storage.

Accordingly, it is desirable to provide a method for producing polyvinylamine based polymers that have five-membered vinyllactams as structural units with more than 10 mol % lactam that are both a technically suitable and cost-effective alternative to currently available processes. Further, it is desirable to provide a method for producing polyvinylamine based polymers that have five-membered vinyllactams as structural units via free radical polymerization of vinylformamide and acrylamide followed by alkaline hydrolysis.

BRIEF SUMMARY lactam-containing polyvinylamine-based polymers, methods for producing lactam-containing polyvinylamine-based polymers, and methods for papermaking are provided. An exemplary method for producing an lactam-containing polyvinylamine-based polymer includes performing radical polymerization of (i) a first monomer of formula I (formula I)

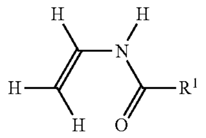

in which $R^1$ denotes H or a C1-C6 alkyl, and (ii) a second monomer that is a vinyl monomer containing an amide functional group; and, optionally, (iii) a third monomer of a monoethylenically unsaturated carboxylic acid, a monoethylenically unsaturated sulfonic acid or a monoethylenically unsaturated phosphonic acid, or salt forms thereof, to obtain a prepolymer. The exemplary method further includes hydrolyzing the prepolymer under alkaline conditions to obtain the lactam-containing polyvinylamine-based polymer.

In another embodiment, a method for papermaking is disclosed. The method includes providing an lactam-containing polyvinylamine-based polymer produced by performing radical polymerization of: (i) a first monomer of formula I (formula I)

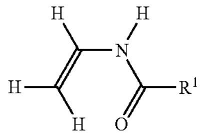

in which $R^1$ denotes H or a C1-C6 alkyl and (ii) a second monomer that is a vinyl monomer containing an amide functionality, and optionally, (iii) a third monomer of a monoethylenically unsaturated carboxylic acid, a monoethylenically unsaturated sulfonic acid or a monoethylenically unsaturated phosphonic acid, or salt forms thereof, to obtain a prepolymer. The method further includes hydrolyzing the prepolymer under alkaline conditions to obtain the lactam-containing polyvinylamine-based polymer. Also, the method includes adding an effective amount of the lactam-containing polyvinylamine-based polymer to pulp fiber to accelerate drainage of the pulp fiber and to increase the retention of fines and fillers by the pulp fiber.

In yet another embodiment, an exemplary lactam-containing polyvinylamine-based polymer is obtained by performing radical polymerization of (i) a first monomer of formula I (formula I)

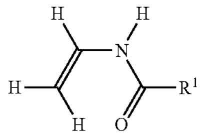

in which $R^1$ denotes a H or C1-C6 alkyl, and (ii) a second monomer that is a vinyl monomer containing an amide functionality, and, optionally, (iii) a third monomer of a monoethylenically unsaturated carboxylic acid, a monoethylenically unsaturated sulfonic acid or a monoethylenically unsaturated phosphonic acid, or salt forms thereof, to obtain a prepolymer; and hydrolyzing the prepolymer under alkaline conditions to obtain the lactam-containing polyvinylamine-based polymer.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

As used herein, "a," "an," or "the" means one or more unless otherwise specified. The term "or" can be conjunctive or disjunctive. Open terms such as "include," "including," "contain," "containing" and the like mean "comprising." The term "about" as used in connection with a numerical value throughout the specification and the claims denotes an interval of accuracy, familiar and acceptable to a person skilled in the art. In general, such interval of accuracy is ±ten percent. Thus, "about ten" means nine to eleven. All numbers in this description indicating amounts, ratios of materials, physical properties of materials, and/or use are to be understood as modified by the word "about," except as otherwise explicitly indicated. As used herein, the "%" described in the present disclosure refers to the weight percentage unless otherwise indicated.

As described herein, methods are provided for producing a vinylamine-based polymer, such as polyvinylamine-based amphoteric terpolymer, for example, an lactam-containing polyvinylamine-based polymer. An exemplary method produces an lactam-containing polyvinylamine terpolymer that contains at least five functional groups that include amine, lactam, amidine, formamide and carboxylate. The exemplary method uses two steps: 1) free radical polymerization of a vinylformamide, a vinyl monomer that contains amide, and, optionally, a vinyl monomer that contains carboxylic acid group; and 2) alkaline hydrolysis of the prepolymer to obtain a water soluble vinylamine-based polymer.

In exemplary embodiments, the method provides advantages over the existing processes for the preparation of lactam-containing polymer that use ethyl acrylate. Instead of ethyl acrylate, the method described herein uses a vinyl monomer that contains amide, such as acrylamide. Further, the method described herein produces the same product composition as existing processes, despite not using ethyl acrylate. Therefore, the method described herein provides a product having the same papermaking application performance as is produced by existing processing, but avoids the drawbacks associated with use of alkyl acrylate.

Further, in exemplary embodiments, the method described herein produces different types of lactam-containing polymers with an appropriate amount of vinyl monomer that contains an amide functional group. This is unlike existing processes that use volatile alkyl acrylate at industrial level production.

In exemplary embodiments, a simple method is provided for producing lactam containing polymers with high purity. The exemplary method has no side reactions and generates no undesirable by-product.

As described, the method performs free radical polymerization of two or three monomers: a first monomer, a second monomer, and optionally, a third monomer.

First Monomer

The first monomer may be generally understood to be a vinylamide monomer. In exemplary embodiments, the first monomer is provided as a monomer of formula I:

(formula I)

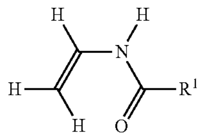

in which $R^1$ denotes H or a C1-C6 alkyl. An exemplary first monomer is a vinylamide monomer. In exemplary embodiments, the first monomer may be, without limitation, N-vinylformamide, N-vinylacetamide, N-methyl-N-vinylformamide, and/or N-methyl-N-vinylacetamide. In certain exemplary embodiments, the vinylamide monomer used in the method is N-vinylformamide or N-vinylacetamide. In a particular exemplary embodiment, the vinylamide monomer used in the method is N-vinylformamide.

With reference to Formula I, examples of first monomers of the Formula I are N-vinylformamide ($R^1$=H), N-vinylacetamide ($R^1$=C1 alkyl), N-vinylpropionamide ($R^1$=C2 alkyl) and N-vinylbutyramide ($R^1$=C3 alkyl). The C3-C6 alkyls can be linear or branched. An example of a C1-C6 alkyl is methyl, ethyl, n-propyl, 1-methylethyl, n-butyl, 2-methylpropyl, 3-methylpropyl, 1,1-dimethylethyl, n-pentyl, 2-methylbutyl, 3-methylbutyl, 2,2-dimethylpropyl or n-hexyl. In exemplary embodiments, $R^1$ is H or a C1-C4 alkyl, such as H or a C1-C2 alkyl, for example, H or C1 alkyl, such as H, that is, the first monomer is N-vinylformamide.

It is contemplated herein that the first monomer may include a mixture of first monomers. In exemplary embodiments, the numeric proportion of the first monomer with $R^1$=H in the total number of all first monomers of the Formula I is 50 to 100%, such as 70 to 100%, for example 85 to 100%, or 95 to 100%.

Second Monomer

In exemplary embodiments, the second monomer is a monomer that contains amide. For example, the second monomer may be a vinyl monomer that contains an amide functional group. Such vinyl monomers include, without limitation, acrylamide, methacrylamide, t-butyl acrylamide, N-alkylacrylamide, N-alkylmethacrylamide, and N-ethylacrylamide. In certain embodiments, the second monomer is acrylamide.

It is contemplated herein that the second monomer may include a mixture of second monomers.

Third Monomer

As recited above, the free radical polymerization process may be performed using the first monomer, the second monomer, and optionally, a third monomer. When used, the third monomer may be a monoethylenically unsaturated carboxylic acid, a monoethylenically unsaturated sulfonic acid or a monoethylenically unsaturated phosphonic acid, or salt forms thereof. In exemplary embodiments, the third monomer is a monoethylenically unsaturated carboxylic acid, or salt forms thereof.

Examples of a third monomer that is a monoethylenically unsaturated carboxylic acid or its salt form are monoethylenically unsaturated C3 to C6 mono- or dicarboxylic acids or salt forms thereof. Examples are acrylic acid, sodium acrylate, methacrylic acid, sodium methacrylate, dimethyl acrylic acid, ethyl acrylic acid, maleic acid, fumaric acid, itaconic acid, mesaconic acid, citraconic acid, methylenemalonic acid, allylacetic acid, vinylacetic acid, or crotonic acid.

Examples of a third monomer that is a monoethylenically unsaturated sulfonic acid or its salt form are vinylsulfonic acid, acrylamido-2-methylpropanesulfonic acid, methacrylamido-2-methylpropanesulfonic acid, allylsulfonic acid, methallylsulfonic acid, sulfoethyl acrylate, sulfoethyl methacrylate, sulfopropyl acrylate, sulfopropyl methacrylate, 2-hydroxy-3-methacryloxypropylsulfonic acid, or styrenesulfonic acid.

Examples of a third monomer that is a monoethylenically unsaturated phosphonic acid or its salt form are vinylphosphonic acid, vinylphosphonic acid monomethyl ester, allylphosphonic acid, allyl phosphonic acid monomethyl ester, acrylamidomethylpropylphosphonic acid, or acrylamidomethylenephosphonic acid.

In exemplary embodiments, the third monomer is a monoethylenically unsaturated carboxylic acid or a monoethylenically unsaturated sulfonic acid, or salt forms thereof. An exemplary third monomer is a monoethylenically unsaturated C3 to C6 mono- or dicarboxylic acid, a monoethylenically unsaturated sulfonic acid or vinylphosphonic acid or salt forms thereof. A further exemplary third monomer is a monoethylenically unsaturated C3 to C6 mono- or dicarboxylic acid, vinylsulfonic acid, acrylamido-2-methylpropanesulfonic acid, methacrylamido-2-methylpropanesulfonic acid, or vinylphosphonic acid, or salt forms thereof. For example, the third monomer may be a monoethylenically unsaturated C3 to C6 mono- or dicarboxylic acid or salt forms thereof. An exemplary third monomer is acrylic acid, methacrylic acid, vinylsulfonic acid, or acrylamido-2-methyl-propanesulfonic acid, or salt forms thereof. In particular embodiments, the third monomer is acrylic acid or methacrylic acid or salt forms thereof. Further, an exemplary third monomer is acrylic acid, sodium acrylate, methacrylic acid, or sodium methacrylate. In certain embodiments, the numeric proportion of the acrylic acid and the methacrylic acid or salt forms thereof in the total number of all third monomers is from 5 to 100%, such as from 50 to 100%, for example from 80 to 100%, or from 95 to 100%.

In certain embodiments, the third monomer is chosen from the group of acrylic acid, methacrylic acid, vinylsulfonic acid, or 2-acrylamido-2-methylpropanesulfonic acid, or salt forms thereof. For example, in certain embodiments, the third monomer is acrylic acid or a salt form thereof, such as sodium acrylate.

It is contemplated herein that the third monomer may include a mixture of third monomers.

In embodiments in which the method includes performing radical polymerization of the first monomer and second monomer only, i.e., in embodiments in which the third monomer is not present, the mole percentage of the first monomer is from 10 to 90% while the mole percentage of the second monomer is from 10 to 90%. In certain exemplary embodiments, the first monomer to second monomer ratio may be 70:30, 60:40, or 50:50. In certain embodiments, the monomers polymerized to obtain the prepolymer contain only the first monomer and the second monomer.

In embodiments in which the method includes performing radical polymerization of the first monomer, the second monomer, and the third monomer, the mole percentage of the first monomer is from 10 to 90%, the mole percentage of the second monomer is from 10 to 90%, and the mole percentage of the third monomer is from 1 to 40%, based on all monomers polymerized to obtain the prepolymer. In certain exemplary embodiments, the first monomer to second monomer ratio may be 70:30, 60:40, or 50:50. In certain exemplary embodiments, the first monomer to second monomer to third monomer ratio may be 70:20:10, 60:30:10, or 70:25:5. In certain embodiments, the monomers polymerized to obtain the prepolymer contain only the first monomer, the second monomer, and the third monomer.

In certain embodiments, the mole percentage of the first monomer is at least 10%, for example at least 20%, such as at least 30%, for example at least 40%, such as at least 50%, for example at least 60%, such as at least 70% or at least 80%. In certain embodiments, the mole percentage of the first monomer is no more than 90%, for example no more than 80%, such as no more than 70%, for example no more than 60%, such as no more than 50% or no more than 40%.

In certain embodiments, the mole percentage of the second monomer is at least 10%, for example at least about 15%, such as at least 20%, for example at least 25%, such as at least 30%, for example at least 35%, such as at least 40%, for example at least 45%, such as at least 50% or at least 55%. In certain embodiments, the mole percentage of the second monomer is no more than 90%, for example no more than 80%, such as no more than 70%, for example no more than 60%, such as no more than 50%, for example no more than 45%, such as no more than 40%, for example no more than 35%, such as no more than 30%, for example no more than 25%, or no more than 20%.

In certain embodiments in which the third monomer is present, the mole percentage of the third monomer is at least 1%, for example at least 2%, such as at least 3%, for example at least 4%, such as at least 5%, for example at least 8%, such as at least 10%, for example at least 12%, such as at least 15% or at least 20%. In certain embodiments, the mole percentage of the third monomer is no more than 40%, for example no more than 30%, such as no more than 20%, for example no more than 15%, such as no more than 12%, for example no more than 10%, such as no more than 8%, for example no more than 5%, such as no more than 4%, for example no more than 3%, or no more than 2%.

Free radical polymerization and ionic polymerization can be used to prepare the prepolymer. In an exemplary embodiment, free radical polymerization is used in aqueous solution. In exemplary embodiments, two classes of commonly-utilized radical polymerization initiators are suitable for use in preparing the disclosed composition: thermal, homolytic dissociation and reduction-oxidation initiators. The former category includes azo or peroxide containing initiators, for example 2,2'-azobis(2-methylpropionamidine) dihydrochloride, 2,2'-azobis(2-methylpropionitrile), benzoyl peroxide, tert-butyl hydroperoxide, and tert-butyl peroxide. The latter category includes combinations of oxidants (such as persulfate salts, peroxides, and percarbonate salts) with appropriate reductants, such as ferrous or sulfite salts. As an example, 2,2'-azobis-2-amidinopropane can be used as an initiator in an amount of from 0.01 to 10 wt % relative to the total monomer. In an exemplary embodiment, the polymerization is performed in water. In other embodiments, the polymerization is performed in a water-solvent mixture.

In an exemplary embodiment, the polymerization process is carried out at a reaction temperature from 60° C. to 95° C., such as from 65° C. to 85° C., for example from 70° C. to 80° C.

In an exemplary embodiment, hydrolysis of the prepolymer is carried out under alkaline conditions using sodium hydroxide or potassium hydroxide. The mole percent of sodium hydroxide based on vinylformamide content in polymer is from 50% to 200%, such as from 80% to 150%, for example from 100% to 140%, or from 110% to 130%.

In an exemplary embodiment, the alkaline hydrolysis of the prepolymer is carried out at a reaction temperature from 60° C. to 110° C., such as from 65° C. to 100° C., for example from 70° C. to 90° C., or from 75° C. to 85° C.

In exemplary embodiments, the alkaline hydrolysis of the prepolymer is carried out for from 1 to 12 hours, such as from 2 to 10 hours, for example from 3 to 8 hours, or from 4 hours to 7 hours.

As described herein, a method is provided for papermaking. An exemplary method includes adding an effective amount of the lactam-containing polymer described herein to pulp fiber to accelerate drainage of the pulp fiber and to increase the retention of fines and fillers by the pulp fiber. In an exemplary embodiment, the effective amount is from 0.01 weight % to 0.5 weight %, based on dry pulp fiber weight.

The exemplary lactam-containing polymer can be used as dry strength additives for paper and paperboard products to accelerate drainage of the wood pulp fiber and to increase the retention of fines and fillers by the pulp fibers during the papermaking process. The products provided comparable drainage performance the prior art composition and Hercobond® 6950 available through Solenis LLC. The lactam containing products of embodiments herein were effective at the treatment level of from 0.01 weight % to 0.5 weight %, based on the dry pulp. The products also gave good dry strength performance to the wood pulp fiber.

The lactam-containing polymers described herein can also be used in a combination with other compositions in order to improve the properties of the polymers. An exemplary composition or compositions that may be used in combination with the lactam-containing polymers described herein can be a cationic, or an anionic, or an amphoteric, or a nonionic synthetic, or a natural polymer. For example, the lactam-containing polymers can be used together with a cationic starch or an amphoteric starch to improve the strength properties of paper products. The lactam-containing polymers described herein can also be used in combination with an anionic polymer, such as a polyacrylic acid, a copolymer of acrylamide and acrylic acid, or a carboxymethyl cellulose; or a cationic polymer such as a crosslinked polyamidoamine, a polydiallyl-dimethylammonium chloride, or a polyamine. Such combinations may be used to form a polyelectrolyte complex to improve the strength properties of paper products. The lactam-containing polymers described herein can also be used in combination with polymeric aldehyde-functional compounds, such as glyoxalated polyacrylamides, aldehyde celluloses and aldehyde functional polysaccharides. Individual compositions or any combination of different compositions may be applied together with the lactam-containing polymers described herein or may be applied sequentially before or after the application of the lactam-containing polymers described herein. Individual compositions may be blended together with the lactam-containing polymers described herein to form a blended composition prior to use.

Exemplary embodiments are provided in the following Examples. These Examples are given by way of illustration only. Thus, various modifications in addition to those shown and described herein will be apparent to those skilled in the art from the foregoing description.

EXAMPLES

The charge densities (Mütek) of the ionized polymer embodiments herein were measured at pH 7.0 using a colloid titration method based on active solids (%). Charge density ("CD") (meq/g) is the amount of cationic charge per unit weight, in milliequivalents per gram of product solids. The polymer sample is titrated with potassium polyvinyl sulfate ("PVSK") to a 0 mV potential with an autotitrator (Brinkmann Titrino) at a fixed titration rate (0.1 mL/dose, 5 sec) and a Mütek particle charge detector (Model PCD 03, BTG, Mütek Analytic Inc., 2141 Kingston Ct., Marietta, GA, USA) is used for end point detection.

The relative solution viscosity ("RSV") was determined using the following method. RSV of a 0.25% solution of the polymer in 1M ammonium chloride is determined at 25° C. by means of an Ubbelohde viscometer and a Brinkmann Viscometer. Apparatus Ubbelohde Viscometer tubes are available from Visco Systems, Yonkers, NY, or Schott, Hofheim, Germany, or Brinkmann Instruments. Brinkmann Viscometer C is available from Brinkmann Instruments Inc., Cantiague Rd., Westbury, NY 11590. Flow times of the 0.25% polymer solution and the pure solvent are measured and the relative viscosity ("$\eta_{rel}$") calculated. The reduced specific viscosity is calculated from the relative viscosity. This method is performed according to ASTM D446.

Brookfield viscosity ("BV") was measured using a DV-II Viscometer (Brookfield Viscosity Lab, Middleboro, MA). A selected spindle (number 2) was attached to the instrument, which was set for a speed of 30 RPM. The reaction solution is prepared at a specific solid content. The Brookfield viscosity spindle was carefully inserted into the solution so as not to trap any air bubbles and then rotated at the above-mentioned speed for 3 minutes at 24° C. The units are in centipoises ("cps").

The term "active" polymer as used herein represents the total weight of the polymer as a percentage of a solution of all the monomers and modifying compounds used for making such a polymer on dry wt. basis.

Comparative Example A includes Hercobond® 6950 (available from Solenis LLC).

Comparative Example B includes a lactam-containing terpolymer (VFA/Ethyl Acrylate/Na acrylate, 70/20/10 mol %) that is prepared using the same procedure as described in WO 2020/053393, which is herein incorporated in its entirety by reference.

Example 1—Preparation of N-VinylLactam-Containing Terpolymer (VFA/AM/Na Acrylate, 70/20/10 mol %)

For pre-terpolymer preparation, a mixture of 55.3 grams of sodium acrylate solution (32%) is adjusted to pH 6.5, and then mixed with 94.5 grams of VFA (99%) and 200.0 grams of water, and the resulting mixture was provided as feed 1. A solution of 53.4 grams of acrylamide (50%) was provided as feed 2. 2,2'-azobis (2-methylpropionamidine) dihydrochloride (0.72 g) was dissolved in 71.6 grams of water at room temperature as feed 3. 2,2'-azobis (2-methylpropionamidine) dihydrochloride (0.43 g) was dissolved in 43.0 grams of water at room temperature as feed 4. 612.8 grams of water and 1.6 grams 75% by weight phosphoric acid were placed in a 2 L glass apparatus with anchor stirrer, reflux condenser, internal thermometer, and nitrogen inlet tube. The reactor was in a water bath with a heating-cooling unit, which automatically regulated the internal temperature. At a speed of 100 rpm, 2.4 grams of a 25% by weight sodium hydroxide solution were added, so that a pH of 6.5 was reached. Subsequently, the receiver was heated to 65° C. in 30 minutes and a stream of nitrogen was introduced at the same time to displace the oxygen in the apparatus. At a constant internal temperature of 65° C., 10% of feed 1 was first added within 3 minutes and mixed in briefly. Then the remainder of feed 1 (90%) and feeds 2 and 3 were started at the same time. The remainder of feed 1 was fed in 3 hours, feed 2 in 3.5 hours, and feed 3 in 4 hours. After the end of feed 3, the batch was kept at 65° C. for a further hour. Subsequently, feed 4 was added in 5 minutes and the reaction temperature was raised to 70° C. The batch was held for 1.5 hours at 70° C. Thereafter, the reflux condenser was replaced by a descending condenser and the internal pressure was slowly reduced by means of a water jet pump to 340 mbar, so that the reactor contents began to boil. A set amount of water was distilled-off under these conditions. The vacuum was then broken with air and the reaction mixture is cooled to room temperature (RT). A slightly cloudy, yellow, viscous solution having a dry content of 15.2% is obtained.

Alkaline hydrolysis of the pre-terpolymer prepared using above procedure was conducted as follows:

173.1 grams of the pre-terpolymer solution were mixed in a 500 ml four-necked flask with paddle stirrer, internal thermometer, dropping funnel and reflux condenser at a stirrer speed of 80 rpm with 2.6 grams of a 40% strength by weight aqueous sodium bisulfate solution and 65.0 grams water and then heated to 80° C. Then 58.1 grams of a 25% by weight aqueous sodium hydroxide solution (120 mol % of VFA) was added. The mixture was kept at 80° C. for 6 hours. The resulting product is cooled to RT and adjusted to pH 6.0 by the addition of 24.6 grams of 37% strength by weight hydrochloric acid and 6.0 grams of water. A slightly cloudy, yellowish, and viscous polymer solution was obtained.

Examples 1-1 and 1-2 were prepared as described in Example 1 except varying amounts of vinylformamide (VFA), acrylamide (AM), and sodium acrylate (Na acrylate) were used in the polymerization, with Example 1-1 using 70:25:5 VFA/AM/Na acrylate, and Example 1-2 using 60:30:10 VFA/AM/Na acrylate.

Example 2—Preparation of Lactam-Containing Polymer (VFA/AM, 70/30 mol %)

For pre-copolymer preparation, 51.14 grams of VFA (99%) and 107.09 grams of water were mixed, and the resulting mixture was provided as feed 1. A solution of 43.48 grams of acrylamide (50%) was provided as feed 2. 2,2'-azobis (2-methylpropionamidine) dihydrochloride (0.39 g) was dissolved in 39.04 grams of water at room temperature as feed 3. 2,2'-azobis (2-methylpropionamidine) dihydrochloride (0.235 g) was dissolved in 23.5 grams of water at room temperature as feed 4. 268.91 grams of water and 0.9232 grams 75% by weight phosphoric acid were placed in a 2 L glass apparatus with anchor stirrer, reflux condenser, internal thermometer, and nitrogen inlet tube. The reactor was in a water bath with a heating-cooling unit, which automatically regulated the internal temperature. At a speed of 100 rpm, 1.29 grams of a 25% by weight sodium hydroxide solution were added, so that a pH of 6.5 was reached. Subsequently, the receiver was heated to 65° C. in 30 minutes and a stream of nitrogen was introduced at the same time to displace the oxygen in the apparatus. Thereafter, the introduction of nitrogen was stopped and, for the further course of the polymerization, passed only via the reflux condenser in order to prevent further diffusion of oxygen. At a constant internal temperature of 65° C., 10% of feed 1 was first added within 3 minutes and mixed in briefly. Then the remainder of feed 1 (90%) and feeds 2 and 3 were started at the same time. The remainder of feed 1 was fed in 3 hours, feed 2 in 3.5 hours, and feed 3 in 4 hours. After the end of feed 3, the batch was kept at 65° C. for a further hour. Subsequently, feed 4 was added in 5 minutes and the reaction temperature was raised to 70° C. The batch was held for 1.5 hours at 70° C. Thereafter, the reflux condenser was replaced by a descending condenser and the internal pressure was slowly reduced by means of a water jet pump to 340 mbar, so that the reactor contents began to boil. 62.1 grams of water were distilled-off under these conditions. The vacuum was then broken with air and the reaction mixture is cooled to RT. A slightly cloudy, yellow, viscous solution having a dry content of 15.2% is obtained.

Alkaline hydrolysis of the pre-terpolymer prepared using above procedure was conducted as follows:

155.96 grams of the pre-terpolymer solution were mixed in a 500 ml four-necked flask with paddle stirrer, internal thermometer, dropping funnel and reflux condenser at a stirrer speed of 80 rpm with 1.55 grams of a 40% strength by weight aqueous sodium bisulfite solution and 65.0 grams water and then heated to 80° C. Then 56.08 grams of a 25% by weight aqueous sodium hydroxide solution (120 mol % of VFA) was added. The mixture was kept at 80° C. for 3 hours. The resulting product is cooled to RT and adjusted to pH 6.0 by the addition of 25.63 grams of 37% strength by weight hydrochloric acid and 6.0 grams of water. A slightly cloudy, yellowish, and viscous polymer solution was obtained.

Examples 2-1 and 2-2 were prepared as described in Example 2, except that varying amounts of vinylformamide (VFA) and acrylamide (AM) were used in the polymerization, with Example 2-1 using 60:40 VFA/AM and Example 2-2 using 50:50 VFA/AM.

Example 3—Preparation of Lactam-Containing Terpolymer (VFA/AM/Na Acrylate, 70/20/10 Mol %) with all Monomers in One Feed For pre-terpolymer preparation, a mixture of 30.04 grams of sodium acrylate solution (32%) is adjusted to pH 6.5, and then mixed with 51.17 grams of VFA (99%), 107.34 grams of water and 28.95 grams of acrylamide (50%), and the resulting mixture was provided as feed 1. 2,2'-azobis (2-methylpropionamidine) dihydrochloride (0.39 g) was dissolved in 39.04 grams of water at room temperature as feed 2. 2,2'-azobis (2-methylpropionamidine) dihydrochloride (0.235 g) was dissolved in 23.6 grams of water at room temperature as feed 3. 268.91 grams of water and 0.92 grams 75% by weight phosphoric acid were placed in a 2 L glass apparatus with anchor stirrer, reflux condenser, internal thermometer, and nitrogen inlet tube. The reactor was in a water bath with a heating-cooling unit, which automatically regulated the internal temperature. At a speed of 100 rpm, 1.36 grams of a 25% by weight sodium hydroxide solution were added, so that a pH of 6.5 was reached. Subsequently, the receiver was heated to 65° C. in 30 minutes and a stream of nitrogen was introduced at the same time to displace the oxygen in the apparatus. Thereafter, the introduction of nitrogen was stopped and, for the further course of the polymerization, passed only via the reflux condenser in order to prevent further diffusion of oxygen. At a constant internal temperature of 65° C., 10% of feed 1 was first added within 3 minutes and mixed in briefly. Then the remainder of feed 1 (90%) and feed 2 was started at the same time. The remainder of feed 1 was fed in 3.5 hours and feed 2 in 4 hours. After the end of feed 2, the batch was kept at 65° C. for a further hour. Subsequently, feed 3 was added in 5 minutes and the reaction temperature was raised to 70° C. The batch was held for 1.5 hours at 70° C. Thereafter, the reflux condenser was replaced by a descending condenser and the internal pressure was slowly reduced by means of a water jet pump to 340 mbar, so that the reactor contents began to boil. 73.8 grams of water were distilled-off under these conditions. The vacuum was then broken with air and the reaction mixture is cooled to RT. A slightly cloudy, yellow, viscous solution having a dry content of 15.2% is obtained.

Alkaline hydrolysis of the pre-terpolymer prepared using above procedure was conducted as follows:

162.95 grams of the pre-terpolymer solution were mixed in a 500 ml four-necked flask with paddle stirrer, internal thermometer, dropping funnel and reflux condenser at a stirrer speed of 80 rpm with 1.59 grams of a 40% strength by weight aqueous sodium bisulfite solution and then heated to 80° C. Then 56.02 grams of a 25% by weight aqueous sodium hydroxide solution (120 mol % of VFA) was added. The mixture was kept at 80° C. for 3 hours. The resulting product is cooled to RT and adjusted to pH 6.0 by the addition of 30.49 grams of 37% strength by weight hydrochloric acid and 6.0 grams of water. A slightly cloudy, yellowish, and viscous polymer solution was obtained.

Chemical and physical properties of all examples prepared according to the present disclosure are summarized in Table I.

TABLE I

Chemical and Physical Properties of Exemplary Compositions

| Products | Prepolymer Compositions | Total Solids (% dry) | pH | Brookfield Viscosity (cPs) | RSV (0.25%) dL/g | CD at pH 7.0 Meq/g |
|---|---|---|---|---|---|---|
| Comparative Example A | VFA/EA/Na acrylate (70:20:10) | 15.3 | 5.9 | 660 | 0.7807 | 4.95 |
| Example 1 | VFA/AM/Na acrylate (70:20:10) | 15.8 | 8.5 | 540 | 0.6841 | 2.62 |
| Example 1-1 | VFA/AM/Na acrylate (70:25:5) | 16.1 | 8.3 | 1112 | 0.786 | 3.91 |
| Example 1-2 | VFA/AM/Na acrylate (60:30:10) | 15.9 | 8.0 | 13740 | — | — |
| Example 2 | VFA/AM (70:30) | 16.9 | 8.7 | 4090 | 0.616 | 2.3 |
| Example 2-1 | VFA/AM (60:40) | 14.7 | 6.2 | 468 | 0.651 | 2.7 |
| Example 2-2 | VFA/AM (50:50) | 14.8 | 8.2 | 1685 | 0.822 | −0.78 |
| Example 3 | VFA/AM/Na Acrylate (70:20:10) | 16.5 | 7.3 | 275 | 0.490 | 4.81 |

Example 4

This example describes the evaluation results of the lactam-containing polymers as drainage aids in papermaking applications. Drainage efficiency of the compositions in the above examples were compared with Hercobond® 6950 and the Comparative Example A based on blank using vacuum drainage test (VDT).

The drainage activity of an exemplary embodiment described herein was determined utilizing a modification of the Dynamic Drainage Analyzer, test equipment available from AB Akribi Kemikonsulter, Sundsvall, Sweden. The modification includes substituting a mixing chamber and filtration medium with both smaller sample volume and cross-sectional area to the machine. A 750 milliliter (ml) sample volume at 0.9% consistency and a 47 millimeter (mm) cross-sectional filtration diameter (60-mesh screen) were used in these tests. The test device applies a 300 mbar vacuum to the bottom of the separation medium. The device electronically measures the time between the application of vacuum and the vacuum break point, i.e. the time at which the air/water interface passes through the thickening fiber mat.

Table II shows VDT vacuum drainage data of several compositions prepared according to the present disclosure versus Hercobond® 6950 and Comparative Example A as benchmarks, using the test as described above.

The specific furnish conditions: Recycled old corrugated paper (OCC) refined to 402 mL Canadian Standard Freeness, 2.5 wt % oxidized starch, pH 7.00, conductivity 2112 μS/cm.

The shorter the drainage time for VDT, the better drainage performance.

TABLE II

Comparison of Exemplary Compositions with Comparative Examples in Drainage Performance of OCC Recycled Fiber

| Product | Descriptions | Dosage (% based dry fiber) | VDT Time (sec) |
|---|---|---|---|
| None | Blank | 0.00 | 28.97 |
| Comparative Example A | Hercobond ® 6950 | 0.10 | 20.87 |
| Comparative Example A | Hercobond ® 6950 | 0.20 | 15.74 |
| Comparative Example B | VFA/EA/Na acrylate (70:20:10) | 0.10 | 20.85 |
| Comparative Example B | VFA/EA/Na acrylate (70:20:10) | 0.20 | 23.07 |
| Example 1 | VFA/AM/Na acrylate (70:20:10) | 0.10 | 20.71 |
| Example 1 | VFA/AM/Na acrylate (70:20:10) | 0.20 | 15.56 |
| Example 3 | VFA/AM/Na acrylate (70:20:10) | 0.10 | 20.06 |
| Example 3 | VFA/AM/Na acrylate (70:20:10) | 0.20 | 18.04 |
| Example 2 | VFA/AM (70:30) | 0.10 | 19.19 |
| Example 2 | VFA/AM (70:30) | 0.20 | 14.42 |
| Example 1-1 | VFA/AM/Na acrylate (70:25:5) | 0.10 | 19.00 |
| Example 1-1 | VFA/AM/Na acrylate (70:25:5) | 0.20 | 14.29 |
| Example 2-1 | VFA/AM (60:40) | 0.10 | 23.68 |
| Example 2-1 | VFA/AM (60:40) | 0.20 | 19.54 |
| Example 2-2 | VFA/AM (50:50) | 0.10 | 29.03 |
| Example 2-2 | VFA/AM (50:50) | 0.20 | 29.51 |

The VDT data demonstrates similar drainage performance of Example 1, Example 1-1, and Example 2, made according to embodiments herein, in comparison with the Comparative Examples A and B.

TABLE III

Comparison of Exemplary Compositions with Comparative Examples in Drainage Performance of OCC Recycled Fiber

| Product | Descriptions | Dosage (% based dry fiber) | VDT Time (sec) |
|---|---|---|---|
| None | Blank | 0.00 | 36.18 |
| Comparative Example A | Hercobond ® 6950 | 0.10 | 23.35 |
| Comparative Example A | Hercobond ® 6950 | 0.20 | 22.8 |
| Comparative Example B | VFA/EA/Na acrylate (70:20:10) | 0.10 | 24.23 |
| Comparative Example B | VFA/EA/Na acrylate (70:20:10) | 0.20 | 14.5 |
| Example 1 | VFA/AM/Na acrylate (70:20:10) | 0.10 | 21.23 |
| Example 1 | VFA/AM/Na acrylate (70:20:10) | 0.20 | 14.81 |
| Example 3 | VFA/AM/Na acrylate (70:20:10) | 0.10 | 21.71 |
| Example 3 | VFA/AM/Na acrylate (70:20:10) | 0.20 | 16.62 |
| Example 1-1 | VFA/AM/Na acrylate (70:25:5) | 0.10 | 22.63 |
| Example 1-1 | VFA/AM/Na acrylate (70:25:5) | 0.20 | 14.87 |
| Example 1-2 | VFA/AM (60:30:10) | 0.10 | 19.53 |
| Example 1-2 | VFA/AM (60:30:10) | 0.20 | 13.84 |

The VDT data in Table III demonstrates better drainage performance of Example 1-2 made according to the present disclosure as compared to Comparative Example A.

Example 5—Evaluation as Dry Strength Additives in Papermaking Applications

The dry strength of papers made with the poly(vinylamine) derivatives of the above examples were compared with the dry strength of paper made with a benchmark dry strength resin poly(vinylamine) (Hercobond® 6950 paper performance additive, available from Solenis LLC).

Linerboard paper is made using a papermaking machine. The paper pulp is a 100% recycled medium and the water chemistry conditions are as follows in ppm: calcium chloride, 1100; sodium sulfate, 1230; sodium acetate, 1370; calcium acetate, 800. Additives: GPC D-28F: 2.5%; Indulin C 2.25%; Advantage 1490, 0.0375%; Perform PC 8713, 0.0125%. The system pH is 7.0 and the pulp freeness is 350-420 CSF with the stock temperature at 52° C. The basis weight is 100 lbs. per 3000 ft2. The vinyllactam-containing polymers prepared according to the present disclosure are added as dry strength agents to the wet end of the papermaking machine at the level of 0.2 to 0.4 weight % of active polymer versus dry paper pulp. Dry tensile strength, Ring Crush and Mullen Burst are used to measure the dry strength effects.

The dry strength test results are shown below in Table IV, in which the performance of Example 1, prepared according to the present disclosure, and benchmarks are shown.

TABLE IV

Dry Strength Performance of Exemplary Compositions with Comparative Examples

| Products | Compositions | Dose % | Mullen Burst | Ring Crush |
|---|---|---|---|---|
| Comparative Example A | Hercobond ® 6950 | 0.2 | 104.0 | 111.2 |
| Comparative Example A | Hercobond ® 6950 | 0.4 | 108.2 | 116.0 |
| Comparative Example B | VFA/EA/Na acrylate (70:20:10) | 0.2 | 107.8 | 108.6 |
| Comparative Example B | VFA/EA/Na acrylate (70:20:10) | 0.4 | 106.0 | 116.0 |
| Example 1 | VFA/AM/Na acrylate (70:20:10) | 0.2 | 106.1 | 109.9 |
| Example 1 | VFA/AM/Na acrylate (70:20:10) | 0.4 | 113.9 | 114.0 |

Table IV compares representative polymers prepared according to an embodiment herein with Comparative Example B. Example 1 and Comparative Example B show similar performance in Mullen Burst and Ring Crush at two different dosages (0.2% and 0.4%). While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for producing a lactam-containing polyvinylamine polymer, the method comprising:

performing radical polymerization of:

(i) a first monomer of formula I

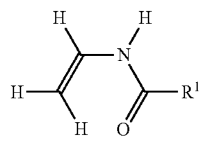

in which $R^1$ denotes H or a C1-C6 alkyl; and (ii) a second monomer selected from the group consisting of acrylamide, methacrylamide, t-butyl acrylamide, N-alkylacrylamide, N-alkylmethacrylamide, and N-ethylacrylamide; and (iii) a third monomer of a monoethylenically unsaturated carboxylic acid, a monoethylenically unsaturated sulfonic acid or a monoethylenically unsaturated phosphonic acid, or salt forms thereof, to obtain a prepolymer; and hydrolyzing the prepolymer under alkaline conditions with sodium hydroxide, wherein the mole percent of the sodium hydroxide based on vinylformamide content in polymer is from 110% to 130%, at about 70 to 90 degrees Celsius for about 2 to 10 hours to obtain the lactam-containing polyvinylamine polymer, wherein the lactam-containing polyvinylamine polymer is water-soluble and contains at least 10 mol % of N-lactam units, and wherein the lactam-containing polyvinylamine polymer has a reduced solution viscosity of from 0.49 to 0.82 dL/g when measured as a 0.25% solution in 1M ammonium chloride at 25° C.

2. The method of claim 1 wherein the water-soluble polyvinylamine-based polymer in the aqueous medium comprises at least five functional groups including N-vinyllactam, carboxylate, amine, formamide and amidine.

3. The method of claim 1 wherein the first monomer is a vinylamide monomer.

4. The method of claim 1 wherein the first monomer is selected from the group consisting of N-vinylformamide, N-vinylacetamide, N-methyl-N-vinylformamide and N-methyl-N-vinylacetamide.

5. The method of claim 1 wherein, when performing radical polymerization, the first monomer is present in a mole percentage of from about 10 to about 90% and the second monomer is present in a mole percentage of from about 90 to about 10%.

6. The method of claim 1 comprising performing radical polymerization of the first monomer, the second monomer, and the third monomer, wherein the third monomer is monoethylenically unsaturated carboxylic acid, or salt forms thereof.

7. The method of claim 1 comprising performing radical polymerization of the first monomer, the second monomer, and the third monomer, wherein the third monomer is selected from the group consisting of acrylic acid, methacrylic acid, vinylsulfonic acid, or 2-acrylamido-2-methylpropanesulfonic acid, or salt forms thereof.

8. The method of claim 1 comprising performing radical polymerization of the first monomer, the second monomer and the third monomer, wherein the first monomer is N-vinylformamide with $R^1$=H in formula I, wherein the second monomer is acrylamide, and wherein the third monomer is acrylic acid or a salt form thereof.

9. The method of claim 1, wherein the first monomer is N-vinylformamide with $R^1$=H in formula I, and wherein the second monomer is acrylamide.

10. The method of claim 1, wherein the first monomer is N-vinylformamide with $R^1$=H in formula I, wherein the second monomer is acrylamide, and wherein for the radical polymerization (i) about 10 to about 90 mol % of N-vinylformamide and (ii) about 90 to about 10 mol % of acrylamide are used.

11. The method of claim 1, wherein the lactam-containing polyvinylamine polymer has a Brookfield viscosity of from 275 to 13740 cPs.

12. The method of claim 1, wherein the lactam-containing polyvinylamine polymer has a charge density at pH 7.0 of from 2.3 meq/g to 4.8 meq/g.

13. A method for producing a lactam-containing polyvinylamine polymer, the method comprising:

performing radical polymerization of:

(i) a first monomer of formula I

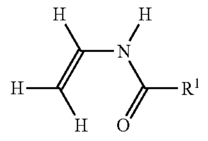

in which $R^1$ denotes H or a C1-C6 alkyl; and (ii) a second monomer selected from the group consisting of acrylamide, methacrylamide, t-butyl acrylamide, N-alkylacrylamide, N-alkylmethacrylamide, and N-ethylacrylamide; and (iii) a third monomer of a monoethylenically unsaturated carboxylic acid, or salt forms thereof, in an aqueous medium at a temperature of from 60° C. to 95° C. using a radical polymerization initiator selected from the group consisting of azo initiators and peroxide initiators to obtain a prepolymer; and hydrolyzing the prepolymer under alkaline conditions with about 110 to about 130 mole % of sodium hydroxide relative to vinylformamide at about 70-90° C. for about 2-10 hours to obtain a water-soluble lactam-containing polyvinylamine polymer containing at least 10 mol % N-lactam units, wherein the lactam-containing polyvinylamine polymer has a reduced solution viscosity of from 0.49 to 0.82 dL/g when measured as a 0.25% solution in 1M ammonium chloride at 25° C.

14. The method of claim 13, wherein the radical polymerization initiator is 2,2'-azobis(2-methylpropionamidine) dihydrochloride and wherein the polymerization is performed at a temperature of about 65° C. to about 85° C.

15. The method of claim 13, wherein the lactam-containing polyvinylamine polymer has a Brookfield viscosity of from about 275 to about 13740 cPs.

16. A method for producing a lactam-containing polyvinylamine polymer, the method comprising:

performing radical polymerization of: (i) N-vinylformamide; (ii) acrylamide; and (iii) acrylic acid or a salt form thereof to obtain a prepolymer, and hydrolyzing the prepolymer under alkaline conditions with about 110 to about 130 mole % of sodium hydroxide relative to N-vinylformamide at about 70-90° C. for about 2-10 hours to obtain a water-soluble lactam-containing polyvinylamine polymer having a charge density of from about 2.3 to about 4.95 meq/g at pH 7.0 and containing at least 10 mol % N-vinyllactam units.

17. The method of claim 16, wherein the lactam-containing polyvinylamine polymer has a reduced solution viscosity of from about 0.49 to about 0.82 dL/g when measured as a 0.25% solution in 1M ammonium chloride at 25° C.

18. The method of claim 16, wherein the lactam-containing polyvinylamine polymer has a Brookfield viscosity of from about 275 to about 13740 cPs.

* * * * *